(12) United States Patent
Albers et al.

(10) Patent No.: US 9,926,421 B2
(45) Date of Patent: *Mar. 27, 2018

(54) VACUUM-SUPPORTED METHOD FOR THE PRODUCTION OF POLYURETHANE FOAM

(71) Applicant: Covestro Deutschland AG, Leverkusen (DE)

(72) Inventors: Reinhard Albers, Leverkusen (DE); Torsten Heinemann, Leichlingen (DE); Stephanie Vogel, Langenfeld (DE); Michael Loof, Leverkusen (DE); Zhihong Gu, Köln (DE); Atsushi Urano, Shanghai (CN); Suk Sangjo, Hefei (CN); Zhao Shihu, Hefei (CN)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 51 days.

This patent is subject to a terminal disclaimer.

(21) Appl. No.: 14/418,237

(22) PCT Filed: Jul. 26, 2013

(86) PCT No.: PCT/EP2013/065780
§ 371 (c)(1),
(2) Date: Jan. 29, 2015

(87) PCT Pub. No.: WO2014/019949
PCT Pub. Date: Feb. 6, 2014

(65) Prior Publication Data
US 2015/0197611 A1    Jul. 16, 2015

(30) Foreign Application Priority Data

Jul. 31, 2012   (WO) ............... PCT/CN2012/001021

(51) Int. Cl.
*C08J 9/14* (2006.01)
*B29C 44/38* (2006.01)
(Continued)

(52) U.S. Cl.
CPC ............. *C08J 9/0023* (2013.01); *B29C 44/18* (2013.01); *B29C 44/3403* (2013.01);
(Continued)

(58) Field of Classification Search
CPC .... C08J 9/12–9/149; C08J 2203/20–2203/202
See application file for complete search history.

(56) References Cited

U.S. PATENT DOCUMENTS 3,970,732 A    7/1976  Slaats et al.
5,667,742 A    9/1997  Dwivedi et al.
(Continued)

FOREIGN PATENT DOCUMENTS

CN    101474842 A    7/2009
CN    101979233 A    2/2011
(Continued)

OTHER PUBLICATIONS

Written Translation of CN101979233A. Feb. 23, 2011.*
(Continued)

*Primary Examiner* — Stephen E Rieth
(74) *Attorney, Agent, or Firm* — K&L Gates LLP

(57) ABSTRACT

The present invention is related to a method for the production of polyurethane foam, comprising the steps of:
  providing an isocyanate-reactive component A comprising a polyol component A1 which further comprises a physical blowing agent T;
  combining at least the isocyanate-reactive component A and an isocyanate component B, thereby obtaining a polyurethane reaction mixture;
  providing the polyurethane reaction mixture in a cavity (11); and (Continued)

reducing the pressure within the cavity (11) to a pressure lower than ambient pressure;
characterized in that the cavity (11) is ventilated to ambient pressure before the gel time of the polyurethane reaction mixture is reached.

18 Claims, 3 Drawing Sheets

(51) Int. Cl.

| | | |
|---|---|---|
| *B29C 44/42* | (2006.01) | |
| *C08J 9/00* | (2006.01) | |
| *B29C 44/18* | (2006.01) | |
| *B29C 44/34* | (2006.01) | |
| *C08G 18/40* | (2006.01) | |
| *C08G 18/48* | (2006.01) | |
| *B29C 44/58* | (2006.01) | |
| *B29C 44/60* | (2006.01) | |
| *C08G 101/00* | (2006.01) | |
| *B29L 31/00* | (2006.01) | |
| *B29K 75/00* | (2006.01) | |

(52) U.S. Cl.
CPC .......... *B29C 44/428* (2013.01); *B29C 44/588* (2013.01); *B29C 44/60* (2013.01); *C08G 18/4018* (2013.01); *C08G 18/482* (2013.01); *C08J 9/0014* (2013.01); *C08J 9/0019* (2013.01); *C08J 9/141* (2013.01); *B29K 2075/00* (2013.01); *B29K 2995/0063* (2013.01); *B29L 2031/7622* (2013.01); *C08G 2101/00* (2013.01); *C08G 2101/005* (2013.01); *C08J 2201/022* (2013.01); *C08J 2375/04* (2013.01)

(56) References Cited

U.S. PATENT DOCUMENTS

| | | |
|---|---|---|
| 5,972,260 A | 10/1999 | Manni |
| 6,274,642 B1 | 8/2001 | Rotermund et al. |
| 6,316,513 B1 * | 11/2001 | McCullough ...... C08G 18/4018 521/163 |
| 6,472,446 B1 | 10/2002 | Riley et al. |
| 7,943,679 B2 | 5/2011 | De Vos et al. |
| 2011/0196055 A1 | 8/2011 | Kramer et al. |

FOREIGN PATENT DOCUMENTS

| | | |
|---|---|---|
| DE | 10145458 A1 | 4/2003 |
| EP | 0905160 A1 | 3/1999 |
| EP | 2463329 A1 | 6/2012 |
| WO | WO-9502620 A1 | 1/1995 |
| WO | WO-00/024813 A1 | 5/2000 |
| WO | WO-2004043665 A1 | 5/2004 |
| WO | WO-2006013004 A1 | 2/2006 |
| WO | WO-2007058793 A1 | 5/2007 |
| WO | WO-2010046361 A1 | 4/2010 |
| WO | WO-2010094715 A2 | 8/2010 |
| WO | WO-2010111021 A1 | 9/2010 |

OTHER PUBLICATIONS

Desmodur 44V20L Information. Bayer MaterialScience. May 24, 2007.*
Tegostab B8423 Information. Evonik Industries. Sep. 2005.*
Sharma, M. K.; Shah, D. O. Introduction to Macro- and Microemulsions. ACS Symposium Series, 1985, vol. 272, Chapter 1, pp. 1-18.*
International Search Report for PCT/EP2013/065780 dated Jun. 3, 2014.

* cited by examiner

VACUUM-SUPPORTED METHOD FOR THE PRODUCTION OF POLYURETHANE FOAM

CROSS-REFERENCE TO RELATED APPLICATIONS

This application is a national stage application (under 35 U.S.C. §371) of PCT/EP2013/065780, filed Jul. 26, 2013, which claims benefit of Application No. PCT/CN2012/001021, filed Jul. 31, 2012, both of which are incorporated herein by reference in their entirety.

The present invention relates to a method for the production of polyurethane foam, comprising the steps of providing an isocyanate-reactive component A comprising a polyol component A1 which further comprises a physical blowing agent T; combining at least the isocyanate-reactive component A and an isocyanate component B, thereby obtaining a polyurethane reaction mixture; providing the polyurethane reaction mixture in a cavity; and reducing the pressure within the cavity to a pressure lower than ambient pressure. The invention also relates to a polyurethane foam obtained by such a method.

It has been reported that in the manufacturing of polyurethane foams from an isocyanate component and a polyol component in the presence of a physical blowing agent an improved thermal isolation is achieved if the blowing agent is dispersed as fine droplets in the polyol component. The reasoning is that these droplets form nucleation sites in the foaming process. The more droplets are present, the more and, most importantly, the smaller cells in the foam are obtained. This leads to a lower thermal conductivity of the foam.

EP 0 905 160 A1 is concerned with emulsions containing polyether alcohols which are used in the production of hard foams based on isocyanates to improve the temperature stability of the foams. Storage-stable halogen-free emulsions used in the production of hard foams based on isocyanates contain: (a) compounds containing hydrogen atoms reactive towards isocyanate groups; (b) water; (c) halogen-free propellants; and optionally (d) usual auxiliary aids and/or additives. (a) is used in an amount of 0.2-80 wt. % and has a functionality of more than 1.5, and an OH number of 10-100 mg KOH/g. (c) consists of 3-10 C hydrocarbons. Independent claims are also included for: (1) the production of the hard foams described; (2) the foams, and (3) the use of the polyether alcohols described.

US 2002/0169228 A1 discloses a phase stable polyol blend composition containing a sucrose and dipropylene glycol co-initiated propylene oxide polyether polyol, a polyester polyol, a compatibilizing agent and a hydrocarbon blowing agent. The polyester polyol is preferably a phthalic anhydride-initiated polyester polyol. The compatibilizing agent is a butanol-initiated propylene oxide polyether surfactant.

WO 2000/24813 A1 relates to a method of preparing a polyurethane foam having excellent heat insulating properties. A method of preparing a rigid polyurethane foam from (1) an organic polyisocyanate comprising an aromatic polyisocyanate, (2) a polyol comprising a polyether polyol and/or polyester polyol, (3) a blowing agent, and (4) a surfactant, a catalyst and other auxiliaries is provided, characterized in that the blowing agent (3) is cyclopentane and water, the polyol (2) is a polyether polyol and/or polyester polyol having poor compatibility with cyclopentane, and cyclopentane is mixed and dispersed in a polyol premix comprising the components (2) to (4).

WO 2006/013004 A1 discloses a method for vacuum foaming refrigerator cabinets in a foaming jig by feeding a chemically reactive mixture into hollow walls of a cabinet to form a polyurethane foam, characterized by the steps of: providing a vacuum chamber; enclosing a foaming jig and a cabinet into said vacuum chamber; connecting the vacuum chamber to a vacuum source; and maintaining vacuum controlled conditions into the vacuum chamber and into the cabinet for a time enabling the foaming polyurethane to rise and fill the hollow walls of the cabinet during the foaming step.

U.S. Pat. No. 5,667,742 discloses a method of manufacturing a rigid polyurethane foam molding for energy absorption, including the steps of introducing a rigid polyurethane foam raw material composed primarily of a polyhydroxy compound and a polyisocyanate compound into a cavity in a mold, and blowing and reacting the rigid polyurethane foam raw material in the cavity, wherein a pack ratio of a core portion of the molding ranges from 0.5 to less than 1.2. Accordingly, the rigid polyurethane foam molding can obtain a plateau value comparable to that of a rigid polyurethane foam slab stock foam suitable for an energy absorbent pad. It is possible that said rigid polyurethane foam raw material is introduced into said cavity and said cavity is then evacuated.

WO 2004/043665 A1 discloses a method for foam molding including foaming a foaming material, characterized in that it comprises a step of providing a mold having an internal space, a step of pressurizing the internal space of the mold, a step of foaming the foaming material under pressure in the internal space of the mold, to thereby control appropriately the foaming of the foaming material, and a step of releasing the internal space of the mold from a pressurized state. The method can be used, in a foam molding of a foaming material, for preventing a closed cell in a foamed product from becoming deformed or shapeless.

WO 2010/094715 A1 discloses a method and an apparatus for foaming a refrigeration container for foodstuffs, with a reactive polyurethane mixture injected under vacuum condition into hollow peripheral walls of the refrigeration container enclosed in a foaming cell. The foaming cell comprises a bottom table for supporting the refrigeration container, side shore panels and an internal shore plug fastened to a closure lid, conformed to rest against outer and inner surfaces of the peripheral walls of the refrigeration container, and sealing gaskets between contact surfaces of the side shore panels, the bottom table and the closure lid, to provide an air-tight closable foaming cell connectable to a vacuum source.

Further exemplary patent publications dealing with vacuum-assisted foaming are CN 101 474 842 A and CN 101 979 233 A.

WO 95/02620 A1 discloses a process for the preparation of rigid polyurethane foams comprising the step of reacting an organic polyisocyanate with an isocyanate-reactive material in the presence of a blowing promoter which is an isocyanate-reactive cyclic carbonate or cyclic urea, and in the presence of an inert, insoluble organic liquid which is present as the dispersed phase of an emulsion or a microemulsion and a metal salt catalyst and a polyether polyol of average nominal functionality 2 to 6 and number average equivalent molecular weight between 1000 and 2000.

WO 2007/058793 A1 discloses a molded rigid polyurethane foam for application in appliance, having a reduced thermal conductivity at densities between 33 and 38 kg/m$^3$ and a process for the production of such foams. The molded rigid polyurethane foam have a ratio of applied foam density (kg/m$^3$) to lambda (mW/mK), measured at 10° C., 24 hours after foam production from 1.65 and to 2.15 and are obtained by the process of injecting into a closed mold cavity under reduced pressure at a packing factor of 1.1 to 1.9 and the reaction mixture comprises: A) an organic polyisocyanate; B) a physical blowing agent, C) a polyol composition containing at least one polyol with a functionality of 3 or greater and a hydroxyl number between 200 and 800 and a water content of 0 to 2.5 weight percent of the total polyol composition; D) catalyst and E) auxiliary substances and/or additives.

WO 2010/111021 A1 discloses a process for preparing a rigid polyurethane foam, comprising: A) forming a reactive mixture containing at least: 1) a polyol mixture containing a) from 7 to less than 20 weight percent of a polyester having a nominal functionality of at least 2.5 to 4 and an OH number of 200 to 500 mg KOH/g. b) from 10 to 50 weight percent of a polyol having a nominal hydroxyl functionality of 3 to 6 and an OH-number of 250 to 600 mg KOH/g. of the type i) an aromatic amine initiated polyol; ii) a cylcloaliphatic amine initiated polyol; iii) a combination of i) and ii c) from 25 to 60 weight percent of a polyether polyol having a nominal hydroxyl functionality of 6 to 8 and an OH-number of 300 to 700 mg KOH/g; 2) at least one hydrocarbon, hydrofluorocarbon, hydrochlorofluorocarbon, fluorocarbon, dialkyl ether or fluorine-substituted dialkyl ether physical blowing agent; and 3) at least one polyisocyanate; and B) subjecting the reactive mixture to conditions such that the reactive mixture expands and cures to form a rigid polyurethane foam.

WO 2010/046361 A1 discloses a process for preparing a cavity-filling, fast-gelling closed cell rigid polyurethane foam comprises preparing a formulation including at least a polyisocyanate, a relatively high viscosity polyol system including at least about 10 percent by weight of an amine-initiated polyol, a physical blowing agent, a blowing catalyst and a curing catalyst, and, optionally, less than about 1.6 weight percent of water based on the polyol system. Other conventional components, such as a chain extender and/or crosslinker, surfactant, and the like may also be included. The formulation is injected under a reduced atmospheric pressure to achieve a closed cell, rigid polyurethane foam having a density of less than about 40 kg/m$^3$, an average cell diameter of less than about 250 microns, and a thermal conductivity of less than about 19 mW/mK at 10° C. average plate temperature.

DE 101 45 458 A1 discloses a rigid polyurethane foam produced from mixtures of (b1) polyfunctional polyether-ols with OH numbers of 40-800 (including at least one with OH no. above 150) and more than 30 wt % ethylene oxide based on total alkylene oxide and (b2) polyether-ols with OH nos. above 40 based mainly on propylene- and/or butylene oxide, using PIR catalysts and an index of 80-500. A method for the production of rigid polyurethane foam with urethane and mainly isocyanurate groups by reacting (a) optionally modified polyisocyanates with (b) a polyol mixture and optionally (c) other compounds with isocyanate-reactive hydrogen atoms, in presence of (d) water, (e) catalysts, (f) fire retardants, (g) blowing agents and optionally (f) other additives etc. The polyol mixture (b) comprises (b1) di- to octafunctional polyether-ol(s) based on ethylene oxide (EO) and optionally propylene oxide (PO) and/or butylene oxide (BO), with an EO content of more than 30 wt % based on total alkylene oxide and an OH number of 40-800 mg KOH/g (including at least one polyether-ol (b1.1) with an OH number of more than 150), and (b2) polyether-ol(s) with an OH number of more than 40, based on PO and/or BO and optionally EO, and the foam is produced with a characteristic index of 80-500 in presence of PIR catalysts.

An ongoing challenge in the handling of blowing agent emulsions in polyols is their stability. This stability is seen as their resistance to phase separation during storage or even under temperature change or under the influence of shear forces which are encountered in mixing heads. According to conventional wisdom an increased stability corresponds with an increased viscosity. This would make the filling of small cavities with foam more difficult.

It would therefore be desirable to have a method of producing polyurethane foam and preferably composite elements with a polyurethane foam having improved thermal insulation properties, wherein the foam is also provided in difficult to reach parts of cavities. Vacuum assisted foaming technology is well known for several decades. It facilitates the extremely quick filling of cavities and leads to a more even foam distribution.

U.S. Pat. No. 3,970,732 discloses a vacuum assisted molding process method and apparatus, particularly for foamed plastic materials, the reduced pressure in the mold cavity causes the material to foam extremely quickly so as completely to fill the cavity.

U.S. Pat. No. 5,972,260 discloses a process and an apparatus for producing polyurethane insulting panels: At first, air in the foaming cavity is removed by blowing in an inert gas through the interior channel of the foam retaining frame, afterwards the foaming cavity is connected to a vacuum source and a defined quantity of a polyurethane mixture with a pentane blowing agent is injected, allowing the mixture to flow and foam in the panel under the vacuum effect.

In 2000, Cannon published an article: "Sandwich Panels: Innovative Solutions using Vacuum-assisted Foam Injection" at the UTEECH 2000 conference, and therefore introduced a successful industrial practice to produce polyurethane sandwich panels with vacuum assisted technology.

However, it is difficult to apply vacuum to cavities with complex shape, like refrigerator cabinets due to foam leakage.

U.S. Pat. No. 7,943,679 discloses a vacuum assisted foaming process for mold filling of cavities in the appliance industry. The big drawback of this technology is leakage. Applying this vacuum technology leads to extensive foam leakage and therefore to foam spots on visible surfaces of appliances.

Obviously, vacuum technology is well known for several decades (see patents & article mentioned above). But all of them still face the very same problem which is leakage. This technological drawback results in foam spots on visible surfaces. Depending on the size of those spots the effort to remove them becomes tremendously high and produces extra costs for the appliance manufacturer. It is therefore clear that there is a big need for further improved vacuum technologies to overcome the actual leakage and sealing difficulties.

It is therefore an object of the present invention to provide an improved process which overcomes the problems of the prior art, in particular the problem of leakage.

This object has been achieved by a method for the production of polyurethane foam, comprising the steps of:
  providing an isocyanate-reactive component A comprising a polyol component A1 which further comprises a physical blowing agent T;
  combining at least the isocyanate-reactive component A and an isocyanate component B, thereby obtaining a polyurethane reaction mixture;

providing the polyurethane reaction mixture in a cavity (11); and reducing the pressure within the cavity (11) to a pressure lower than ambient pressure;

characterized in that the cavity (11) is ventilated to ambient pressure before the gel time of the polyurethane reaction mixture is reached.

It has surprisingly been found that ventilating the cavity or the vacuum system respectively prevents the transition of foam through leaks in the cavity. At the same time, the danger of foam entering the vacuum system has been lowered as well.

Furthermore, it has been surprisingly found that the vacuum assisted foaming process leads to molded polyurethane foams possessing a more even density distribution and that the application of this technology for the production of appliances results in immaculate foam surfaces with significantly less voids. In other words, the invented vacuum-assisted foaming technology does not struggle with leakage.

The inventive method comprises the possibilities that the polyurethane reaction mixture is provided in the cavity before, after or simultaneously with reducing the pressure within the cavity to a pressure lower than ambient pressure.

One preferred embodiment is that that the pressure within the cavity is reduced before the polyurethane reaction mixture is provided in the cavity. This is advantageous because evacuation of the cavity may take some time and if a reactive polyurethane reaction mixture is used, foaming already starts when the pressure is still being reduced. This might lead in some cases to undesired foam properties.

Another preferred embodiment is that the pressure within the cavity is reduced after the polyurethane reaction mixture is provided in the cavity. This is advantageous because it minimizes any potential loss of blowing agent.

Owing to the comparatively low viscosity of the emulsion it is possible to strike a favorable balance between filling time, filling precision in difficult spaces and cell disruption in the case of too high vacuum levels applied. For example, the pressure within the cavity may be reduced by $\geq 1$ mbar to $\leq 900$ mbar, preferably $\geq 20$ mbar to $\leq 600$ mbar and more preferred $\geq 50$ mbar to $\leq 300$ mbar. The pressure may be held constant throughout the expansion of the foam within the cavity with the use of a vacuum monitoring system or it may vary, such as being allowed to rise during the expansion or even being lowered to account for an increase in viscosity of the reaction mixture.

According to a particularly preferred embodiment of the inventive method, the cavity is ventilated to ambient pressure when 60 to 99% of the gel time of the polyurethane reaction mixture is reached, in particular, when 70 to 95% of the gel time is reached and more preferred 75 to 90%. This embodiment is highly preferred as ventilating the cavity or the system respectively prevents the foam from passing through leaks in the cavity, which often occur in refrigerator housings, in particular near the door sealing area. Protruding foam parts would have to be removed chemically or mechanically afterwards, which increases the production time and costs. Also, ventilation in the before-mentioned manner reduces the risk of foam travelling into the vacuum system.

In the present invention, the cream time is defined as the time from the preparation of the reaction mixture until the recognizable beginning of the foaming mixture. It is determined optically.

The gel time (or string time) is defined as the time from the preparation of the reaction mixture until the transition from the fluid to the solid state is reached. It is determined by repeatingly dipping and pulling out a wooden stick into the reaction mixture. The gel time is reached as soon as strings are formed while pulling the wooden stick out of the reaction mixture.

The tack-free time is defined as the time from the preparation of the foam reaction mixture until the surface of the foam is tack free. It is determined by depositing a wooden stick on the foam surface. The tack-free time is reached if lifting the wooden stick does not lead to delamination or rupture of the foam surface, in other words, when the foam surface is not tacky anymore.

In another embodiment of the method according to the invention the polyurethane reaction mixture has a gel time of $\leq 50$ seconds, preferably $\leq 40$ seconds and more preferred $\leq 35$ seconds. Given reactivities refer to manually prepared foams. A gel time of $\leq 50$ seconds or less may be achieved by the selection of appropriate catalysts and their amounts and of other fast reacting components in the isocyanate-reactive component A.

In another embodiment of the inventive method, before ventilating to ambient pressure the step of reducing the pressure within the cavity to a pressure lower than ambient pressure is conducted in such a way that after the initial reduction of the pressure to a desired level, the pressure is allowed to rise as a consequence of an expansion of the polyurethane reaction mixture, in particular until ambient pressure is reached. In other words, the pressure is at first reduced to a desired level—for each cavity area individually, if desired. Then, the vacuum lines are closed and the pressure level in the cavity is left for itself. The pressure level increases within the cavity area during the course of the foaming reaction. This allows to further control the cell growth during foaming and the final cell size of the foam. In its simplest form, vacuum is applied to a closed cavity before and/or after injection of the reaction mixture and then the vacuum application is ceased before the gel time of the reaction mixture.

It is however also in the scope of the present invention that the underpressure in the cavity is maintained during the foaming, in other words, the vacuum lines remain open. In such an embodiment, it is especially preferred that the cavity or system respectively is ventilated to ambient pressure before the gel time of the polyurethane reaction mixture is reached.

A further preferred embodiment of the inventive method is characterized in that before ventilating to ambient pressure, the reduced pressure is mostly kept constant under consideration of technically unavoidable leaking, in particular leaking of the cavity.

According to a preferred embodiment of the inventive method, the pressure within the cavity is adjusted to different levels at different cavity areas, in particular by using two individually operatable vacuum systems. The pressure difference between the at least two different cavity areas can be adjusted to at least 50 mbar, more preferred at least 100 mbar.

It is further preferred that the pressure level within each of the different cavity areas is adjusted with respect to the shape of that cavity area, whereas in particular the pressure level reduction in larger and/or higher cavity areas is higher than in smaller and/or lower cavity areas. In other words, the pressure in each of the areas can be individually adjusted to an optimum regarding the desired foam properties. The optimum pressure level for each cavity area can be identified for a certain polyurethane reaction mixture by some foaming experiments and analysis of the foam structure and foam quality in that particular area. By this measure, the foam growth can be manipulated due to the pressure difference and the air flux within the cavity. It is however also possible that the different cavity areas are separated from each other by a separating member, like a sheet material.

In a further preferred embodiment of the inventive method, the duration of the pressure level reduction is shorter than the gel time of the reaction mixture, wherein the polyurethane reaction mixture has preferably a gel time of ≤50 seconds, whereas in particular the duration of the pressure level reduction is adjusted with respect to the shape of each cavity area and that the duration of reduced pressure in larger and/or higher cavity areas is preferably longer than in smaller and/or lower cavity areas.

The cavity into which the reaction mixture is provided, preferably injected, may be a cavity which is sealable on its own. Examples include a mold and closed frames or shells for insulation linings. It is also possible that a space is provided between two or more surfaces and these surfaces are positioned within an evacuatable mold. This may be the case in the production of sheet panels.

The polyurethane foams obtained by the method according to the invention have an average cell size of preferably ≥80 μm to ≤250 μm, more preferably ≥80 μm to ≤250 μm determined by bright field transmission microscopy. Thermal conductivities (DIN 12664) may be in a range of ≥15 mW/m K to ≤25 mW/m K, preferably ≥16 mW/m K to ≤20 mW/m K or ≥16 mW/m K to ≤19 mW/m K.

In describing the present invention the term "polyurethane" or "polyurethane polymer" is meant to encompass polyurethane (PUR) polymers, polyisocyanurate (PIR) polymers, polyurea polymers and mixed polyurethane-polyisocyanurate/polyurea polymers.

It is further preferred that the physical blowing agent T is present in the isocyanate-reactive component A in the form of an emulsion with the polyol component A1 constituting the continuous phase and droplets of the physical blowing agent T the dispersed phase of the emulsion, wherein the average size of the droplets of the physical blowing agent T is ≥0,1 μm to ≤20 μm, the droplet size being determined by using an optical microscope operating in bright field transmission mode.

Emulsions with the aforementioned droplet sizes are particularly suitable for vacuum-assisted foaming processes. Their viscosity is low when compared to emulsions with other blowing agent droplet sizes so that complicated interior geometries of cavities may be filled without the need of resorting to excessively high vacuums. Furthermore, the emulsions are stable for the purposes of the preparation of polyurethane foams. "Stable" is meant to signify that the emulsions show no visible phase separation between isocyanate-reactive component A and the blowing agent T, when stored at room temperature (20° C.) and ambient pressure (1013 mbar), for at least 2 hours, preferably at least 1 day, more preferred 3 days and particularly preferred at least 4 days. The (lack of) phase separation may be observed by examining the sample with the aid of a microscope. The emulsions can display a structural viscosity or shear thinning.

Due to their stability, the emulsions may be prepared in advance. This has the advantage that they may be processed on foaming machines which are constructed to accommodate solutions of the blowing agent in the polyol formulation. The emulsions may be prepared by mixing the components for A in arbitrary order, in general at room temperature and ambient pressure and then adding the blowing agent T. The emulsifying may take place using a high shear mixer such as a jet dispergator or a rotor dispergator. If desired, the emulsions may however also be prepared within a mixing head just prior to injection into the cavity.

The droplet size of the blowing agent T is preferably ≥0,1 μm to ≤15 μm and more preferred ≥1 μm to ≤15 μm. The size is determined via an optical microscope using bright field transmission microscopy. Suitable layer thicknesses for the optical inspection of the specimen are 20 μm to 40 μm.

The use of the term "a" in connection with components according to the invention such as certain polyols is not to be understood as a numerating term. Expressions like "a polyol" only mean "exactly one polyol" if this expressly stated. For example, it is possible that more than one polyol A1a is present in certain embodiments further outlined below.

An "emulsion" is to be understood as a finely distributed mixture of two liquids, wherein one liquid (the physical blowing agent T) is dispersed in the other liquid (the isocyanate-reactive component A) in the form of small droplets. Such an emulsion is distinct from a solution as well as from a microemulsion. In microemulsions the dispersed phase is so finely distributed that no light scattering occurs. They appear clear and transparent to visible light. In addition, microemulsions can only be prepared with the aid of emulsifiers. In the preparation of the emulsions according to the invention emulsifiers are not excluded per se, but are not strictly necessary.

A "physical blowing agent" is a compound or compound mixture which is volatile and does not react with the isocyanate component.

The "functionality" is the theoretical functionality which may be calculated from known materials used and their mass proportions.

Throughout the present invention the number average molecular weight is to be understood as being determined by gel permeation chromatography according to DIN 555672-1 (Aug. 2007) unless stated otherwise. Likewise, the hydroxyl number (OH number) is to be understood as being determined according to DIN 53240. Viscosities are to be understood as being determined at 25° C. according to EN ISO 3219 (Oct. 1994). Foam densities are to be understood as being determined according to DIN EN 1602 or determined on the samples for thermal conductivity according to DIN 52616 using the corresponding mass.

Polyols used in the isocyanate-reactive component A may be obtained by methods generally known in the art. Polyester polyols are produced by the polycondensation of dicarboxylic acid equivalents and low molecular weight polyols. Polyether polyols are produced by the polyaddition (anionically or cationically) of epoxides to starters. The addition of epoxides to polyester polyols leads to polyester polyether polyols. If needed, catalysts known in the art may be used.

The present invention will now be described with reference to further aspects and embodiments. They may be combined freely unless the context clearly indicates otherwise.

In one embodiment of the method according to the invention the polyol component A1 comprises:

A1a: a polyether polyol with a hydroxyl number of ≥15 mg KOH/g to ≤550 mg KOH/g and a functionality of ≥1,5 to ≤6,0 obtained by the addition of an epoxide to one or more starter compounds selected from the group of carbohydrates and/or at least difunctional alcohols; and A1b: a polyether polyol with a hydroxyl number of ≥100 mg KOH/g to ≤550 mg KOH/g and a functionality of ≥1,5 to ≤5,0 obtained by the addition of an epoxide to an aromatic amine.

With respect to A1a, the hydroxyl number is preferably ≥50 mg KOH/g to ≤500 mg KOH/g and more preferred ≥100 mg KOH/g to ≤450 mg KOH/g. The OH functionality is preferably ≥2,0 to ≤5,5 and more preferred ≥2,5 to ≤5,0. Preferred starter compounds are saccharose, mixtures of saccharose and propylene glycol, mixtures of saccharose and ethylene glycol, mixtures of saccharose, propylene glycol and ethylene glycol, furthermore sorbitol, or mixtures of sorbitol and glycerine.

Preferred epoxides are 1,2-butylene oxide, 2,3-butylene oxide, ethylene oxide and propylene oxide alone or as mixtures. Particularly preferred are ethylene oxide and propylene oxide which may be employed alone or as mixtures. In the latter case a statistical distribution of the oxyalkylene units from the ethylene oxide and propylene oxide as well as the deliberate formation of block copolymer structures is possible. Preferred starter substances are mixtures comprising saccharose, propylene glycol and ethylene glycol and it is preferred to employ only propylene oxide as epoxide.

With respect to A1b, this polyether polyol is preferably started on ortho, meta or para-toluylene diamine or mixtures of these isomers. The hydroxyl number is preferably ≥200 mg KOH/g to ≤500 mg KOH/g and more preferred ≥350 mg KOH/g to ≤470 mg KOH/g. The OH functionality is preferably ≥2,0 to ≤4,5 and more preferred ≥2,5 to ≤4,0. Particularly preferred is ortho-toluylene diamine. This may be present in the form of the 2,3- and the 3,4-isomers. It is also contemplated to employ other aromatic amines such as benzene diamine (all isomers), or methylenediphenyl-diamine (all isomers).

Preferred epoxides are 1,2-butylene oxide, 2,3-butylene oxide, ethylene oxide and propylene oxide alone or as mixtures. Particularly preferred are ethylene oxide and propylene oxide which may be employed alone or as mixtures. In the latter case a statistical distribution of the oxyalkylene units from the ethylene oxide and propylene oxide as well as the deliberate formation of block copolymer structures is possible. Preferred starter substances are mixtures comprising saccharose, propylene glycol and ethylene glycol and it is preferred to employ only propylene oxide as epoxide.

It is preferred that the polyol component A1 further comprises:

A1c: a polyester polyether polyol with a hydroxyl number of ≥100 mg KOH/g to ≤450 mg KOH/g and a functionality of ≥1,5 to ≤3,5 obtained by the addition of an epoxide to the esterification product of an aromatic dicarboxylic acid derivative and an at least difunctional alcohol.

With respect to A1c, preferably the aromatic dicarboxylic acid derivative is a phthalic acid derivative, in particular phthalic acid anhydride. The hydroxyl number is preferably ≥150 mg KOH/g to ≤400 mg KOH/g and more preferred ≥200 mg KOH/g to ≤400 mg KOH/g. The OH functionality is preferably ≥1,5 to ≤3,0 and more preferred ≥1,8 to ≤2,8.

Suitable at least difunctional alcohols include ethylene glycol, diethylene glycol and their higher homologues, 1,2-propanediol, dipropylene glycol and higher homologues, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol and higher homologues, 2-methylpropanediol-1,3, neopentylglycol, 3-methylpentanediol-1,3, glycerine, pentaerythritol, 1,1,1-trimethylolpropane, and carbohydrates with 5 to 12 carbon atoms such as isosorbid. Preferred are ethylene glycol and diethylene glycol.

Suitable epoxides include ethylene oxide and propylene oxide. They may be used in such an amount that the content of oxyethylene groups is 5 mass-% to 50 mass-%, preferably 10 mass-% to 40 mass-% and particularly preferred 15 mass-% to 30 mass-%, with respect to the total mass of polyol A1c.

Especially suitable is a polyester polyether polyol obtained by the addition of ethylene oxide and/or propylene oxide to the esterification product of phthalic acid anhydride and ethylene and/or propylene glycol.

It is also preferred that the polyol component A1 further comprises:

A1c': a polyester polyol with a hydroxyl number of ≥100 mg KOH/g to ≤450 mg KOH/g and a functionality of ≥1,5 to ≤3,5 obtained by the esterification of a polycarboxylic acid component and a polyalcohol component, wherein the total content of the dicarboxylic acid derivatives employed in the esterification, based on free aromatic dicarboxylic acids, is ≤48,5 mass-%, based on the total mass of polyalcohol component ant polycarboxylic acid component.

With respect to A1c', the hydroxyl number is preferably ≥150 mg KOH/g to ≤400 mg KOH/g and more preferred ≥200 mg KOH/g to ≤400 mg KOH/g. The OH functionality is preferably ≥1,5 to ≤3,0 and more preferred ≥1,8 to ≤2,8.

Suitable polycarboxylic acid components include polycarboxylic acids with 2 to 36, preferably 2 to 12 carbon atoms. Preferred are succinic acid, fumaric acid, maleic acid, maleic acid anhydride, glutaric acid, adipic acid, sebacic acid, suberic acid, azelaic acid, 1,10-decanedicarboxylic acid, 1,12-dodecanedicarboxylic acid, phthalic acid, phthalic acid anhydride, isophthalic acid, terephthalic acid, pyromellitic acid and/or trimellitic acid. Particularly preferred are phthalic acid and phthalic acid anhydride or phthalic acid and adipic acid.

Suitable at least difunctional alcohols include ethylene glycol, diethylene glycol and their higher homologues, 1,2-propanediol, dipropylene glycol and higher homologues, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol and higher homologues, 2-methylpropanediol-1,3, neopentylglycol, 3-methylpentanediol-1,3, glycerine, pentaerythritol, 1,1,1-trimethylolpropane, and carbohydrates with 5 to 12 carbon atoms such as isosorbid. Preferred are ethylene glycol and diethylene glycol.

Especially suitable is a polyester polyol obtained from phthalic acid and phthalic acid anhydride or phthalic acid and adipic acid as the acid component and ethylene glycol and/or diethylene glycol as the alcohol component.

It is also preferred that the polyol component A1 further comprises:

A1d: a polyether polyol with a hydroxyl number of ≥500 mg KOH/g to ≤1000 mg KOH/g and a functionality of ≥1.5 to ≤5.0 obtained by the addition of an epoxide to an aliphatic amine and/or a polyfunctional alcohol. Preferably the hydroxyl number is ≥600 mg KOH/g to ≤950 mg KOH/g and more preferably ≥700 mg KOH/g to ≤900 mg KOH/g and the functionality is preferably ≥2,0 to ≤4,5, more preferred ≥2,5 to ≤4,0. It is particularly preferred that polyol A1d is obtained by the addition of epoxides to ethylene diamine or trimethylolpropane. Preferred epoxides are ethylene oxide and propylene oxide, the latter being particularly preferred.

In another embodiment of the method according to the invention the polyol component A1 further comprises:

A1e: a di-, tri- or tetrafunctional aminic or alcoholic chain extender or cross-linker. A1e is preferably chosen from the group of glycerine, butanediol, ethylene glycol, diethylene glycol, propylene glycol, ethylene diamine, ethanolamine, triethanolamine, trimethylolpropane and/or pentaerythritol.

The polyol component A1 may further comprise polyethercarbonate polyols A1f such as those obtained by the catalyzed reaction of epoxides and carbon dioxide in the presence of H-functional starter substances (e.g., EP 2 046 861 A1). These polyethercarbonate polyols usually have a functionality of ≥1, preferably ≥2,0 to ≤8,0 and particularly preferred ≥2,0 to ≤6,0. Their number average molecular weight is preferably ≥400 g/mol to ≤10000 g/mol, preferably ≥500 g/mol to ≤6000 g/mol.

In another embodiment of the method according to the invention the physical blowing agent T is selected from the group of hydrocarbons, halogenated ethers and/or perfluorinated hydrocarbons with 1 to 6 carbon atoms. Particularly preferred are butane, isobutane, n-pentane, isopentane, cyclopentane, n-hexane, isohexane, cyclohexane, methylal and perfluorohexane. Cyclopentane is most preferred. These blowing agents form an emulsion with the isocyanate reactive component A under the prevalent conditions (pressure temperature).

In general it is advantageous that the isocyanate-reactive component A comprises adjuvants, additives and the like such as water, foam stabilizers, catalysts, flame retardants, etc. Therefore, in another embodiment of the method according to the invention the isocyanate-reactive component A further comprises:

A2: water;

A3: at least one stabilizer selected from the group of polyether polydimethylsiloxane copolymers; (preferably those copolymers which have been functionalized with propylene oxide- or ethylene oxide-containing polyether side chains) and A4: at least one catalyst selected from the group of triethylenediamine, N,N-dimethylcyclohexylamine, tetramethylenediamine, 1-methyl-4-dimethylaminoethylpiperazine, triethylamine, tributylamine, dimethylbenzylamine, N,N'N"-tris-(dimethylaminopropyl)hexahydrotriazine, dimethylaminopropylformamide, N,N,N',N'-tetramethylethylenediamine, N,N,N',N'-tetramethylbutanediamine, tetramethylhexanediamine, pentamethyldiethylenetriamine, tetramethyldiaminoethyl ether, dimethylpiperazine, 1,2-dimethylimidazole, 1-azabicyclo[3.3.0]octane, bis(dimethylaminopropyl) urea, N-methylmorpholine, N-ethylmorpholine, N-cyclohexylmorpholine, 2,3-dimethyl-3,4,5,6-tetrahydropyrimidine, triethanolamine, diethanolamine, triisopropanolamine, N-methyldiethanolamine, N-ethyldiethanolamine and/or dimethylethanolamine.

In case a high polyisocyanurate content is desired a catalyst selected from the group of tin(II) acetate, tin(II) octoate, tin(II) ethylhexoate, tin(II) laurate, dibutyltindiacetate, dibutyltindilaurate, dioctyltindiacetate, tris-(N,N-dimethylaminopropyl)-s-hexahydrotriazine, tetramethylammonium hydroxide, sodium acetate, sodium octoate, potassium acetate, potassium octoate and/or sodium hydroxide.

The added water acts as a chemical co-blowing agent. By reacting with NCO groups carbon dioxide is liberated which acts as a blowing agent in addition to T. An optional chemical co-blowing agent that may be selected is formic acid or another carboxylic acid. While formic acid is the carboxylic acid of preference, it is also contemplated that minor amounts of other aliphatic mono- and polycarboxylic acids may be employed, such as those disclosed in U.S. Pat. No. 5,143,945, which is incorporated herein by reference in its entirety, and including isobutyric acid, ethylbutyric acid, ethylhexanoic acid, and combinations thereof.

In another embodiment of the method according to the invention the mass ratio of A1:T is ≥5:1 to ≤12:1. This mass ratio is contemplated in the interest of obtaining emulsions which are as stable as possible. Preferably the mass ratio is ≥5.5:1 to ≤10:1 and more preferred ≥6:1 to ≤9:1.

In another embodiment of the method according to the invention the polyol component A1 has a viscosity according to EN ISO 3219 at 20° C. of ≥1000 mPas to ≤18000 mPas. Preferably the viscosity is ≥1500 mPas to ≤15000 mPas and more preferred ≥2000 mPas to ≤12000 mPas.

In particularly preferred cases no further components are present in the emulsion. The emulsion then consists of, at the most, A1a, A1b, A1c/A1c', A1d, A1e, A1f, A2, A3, A4 and T. Particularly preferred are emulsions consisting of A1a, A1b, A1c/A1c', A2, A3, A4 and T.

The emulsions may be prepared by mixing the components for A in arbitrary order, in general at room temperature and ambient pressure and then adding the blowing agent T. The emulsifying may take place using a high shear mixer such as a jet dispergator or a rotor dispergator. Representative examples include those published in Schubert, H. (editor); Emulgiertechnik; R. Behr's Verlag, Hamburg, 2005.

Such emulsions obtained are particularly stable without having an excessively high viscosity. "Stable" is meant to signify that the emulsions show no visible phase separation between isocyanate-reactive component A and the blowing agent T, when stored at room temperature (20° C.) and ambient pressure (1013 mbar), for at least 2 hours, preferably at least 1 day, more preferred 3 days and particularly preferred 4 days. The (lack of) phase separation may be observed by examining the sample with the aid of a microscope.

In another embodiment of the method according to the invention the isocyanate component B comprises:

B1: at least one isocyanate selected from the group of toluylene diisocyanate, diphenylmethane diisocyanate, polyphenylpolymethylene polyisocyanate, xylylene diisocyanate, naphthylene diisocyanate, hexamethylene diisocyanate, diisocyanatodicylcohexylmethane and/or isophorone diisocyanate;

and/or

B2: an isocyanate-terminated prepolymer obtained from at least one polyisocyanate B1 and at least one isocyanate reactive compound selected from the group of:

A1a: a polyether polyol with a hydroxyl number of ≥15 mg KOH/g to ≤550 mg KOH/g and a functionality of ≥1.5 to ≤6.0 obtained by the addition of an epoxide to one or more starter compounds selected from the group of carbohydrates and/or at least difunctional alcohols;

A1b: a polyether polyol with a hydroxyl number of ≥100 mg KOH/g to ≤550 mg KOH/g and a functionality of ≥1.5 to ≤5.0 obtained by the addition of an epoxide to an aromatic amine;

A1c: a polyester polyether polyol with a hydroxyl number of ≥100 mg KOH/g to ≤450 mg KOH/g and a functionality of ≥1,5 to ≤3,5 obtained by the addition of an epoxide to the esterification product of an aromatic dicarboxylic acid derivative and an at least difunctional alcohol;

A1c': a polyester polyol with a hydroxyl number of ≥100 mg KOH/g to ≤450 mg KOH/g and a functionality of ≥1,5 to ≤3,5 obtained by the esterification of a polycarboxylic acid component and a polyalcohol component, wherein the total content of the dicarboxylic acid derivatives employed in the esterification, based on free aromatic dicarboxylic acids, is ≤48,5 mass-%, based on the total mass of polyalcohol component ant polycarboxylic acid component;

A1d: a polyether polyol with a hydroxyl number of ≥500 mg KOH/g to ≤1000 mg KOH/g and a functionality of ≥1,5 to ≤5,0 obtained by the addition of an epoxide to an aliphatic amine and/or a polyfunctional alcohol; and/or A1f: a polyether carbonate polyol with a functionality of ≥1 to ≤8,0 and a number average molecular weight of ≥400 g/mol to ≤10000 g/mol.

Preferred polyols A1a-f have already been described in connection with the isocyanate-reactive component A and can, of course, also be employed for the prepolymers.

It is preferred that the reaction of the isocyanate component B with the isocyanate-reactive component A is performed at an index of ≥95 to ≤180, ≥95 to ≤150 or ≥100 to ≤130. The "index" is to be understood as the quotient of NCO groups employed [mol] divided by the stoichiometrically needed NCO-reactive groups [mol] multiplied by 100. As one NCO-reactive group reacts with one NCO group, the index is:

$$\text{index} = (\text{mol NCO groups/mol NCO-reactive groups}) \times 100$$

As the method according to the present invention is especially suited for filling cavities with complicated interior geometries, in another embodiment of the method according to the invention the cavity into which the polyurethane reaction mixture is provided is a refrigerator insulation frame. Of course, insulation frames for refrigerator-deep freezer combinations are also encompassed.

Another aspect of the present invention is a polyurethane foam obtained by a method according to the invention. Preferably this foam has a core density of ≥27 kg/m$^3$ to ≤45 kg/m$^3$ determined according to DIN 12664. An even more preferred core density is ≥29 kg/m$^3$ to ≤40 kg/m$^3$ determined according to DIN 12664.

EXAMPLES

The invention will be further described with reference to the following examples and figures without wishing to be limited by them.

Figure 1:
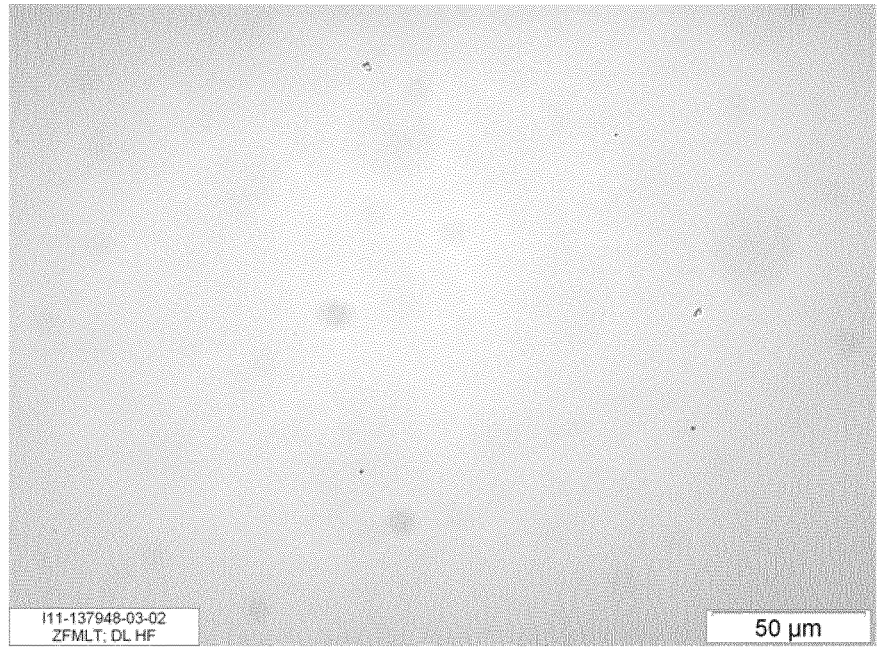
FIG. 1 shows a bright field transmission microscopy image of the soluble polyol formulation according to comparative example 1.
Figure 2:
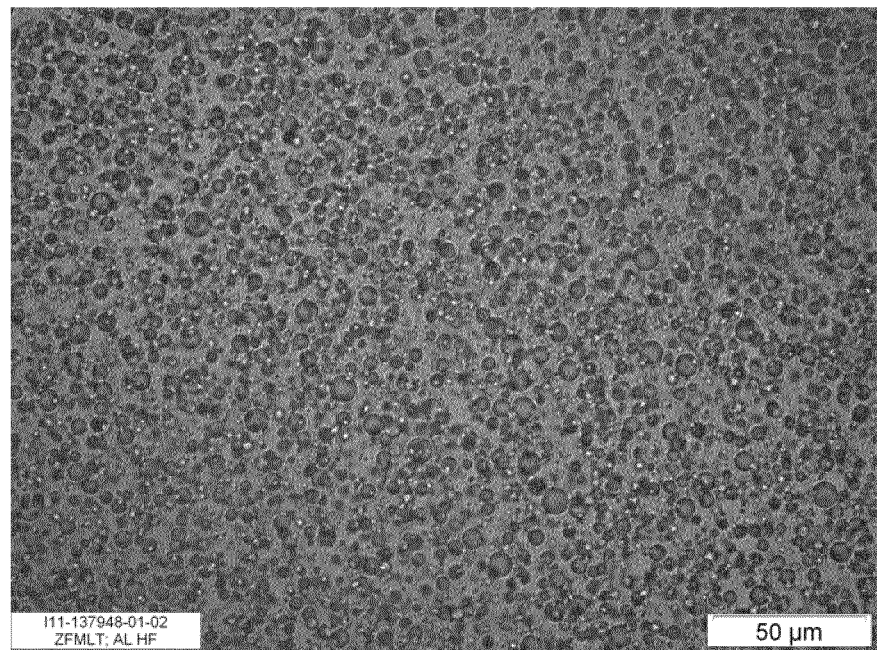
FIG. 2 shows an image of the emulsion system according to example 2.
Figure 3:
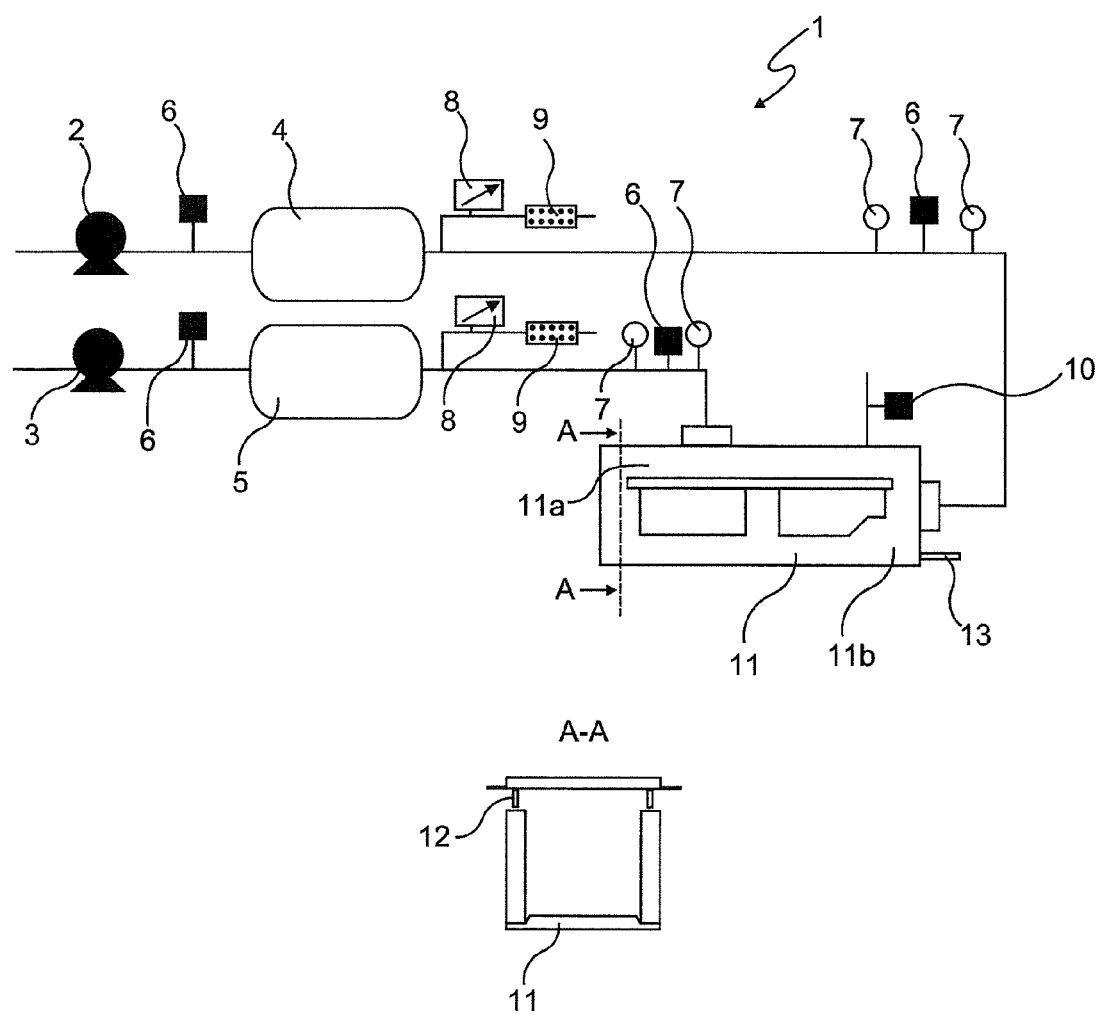
FIG. 3 shows a scheme of the apparatus for the reduced pressure assisted foaming technology (RAF).
Figure 4:
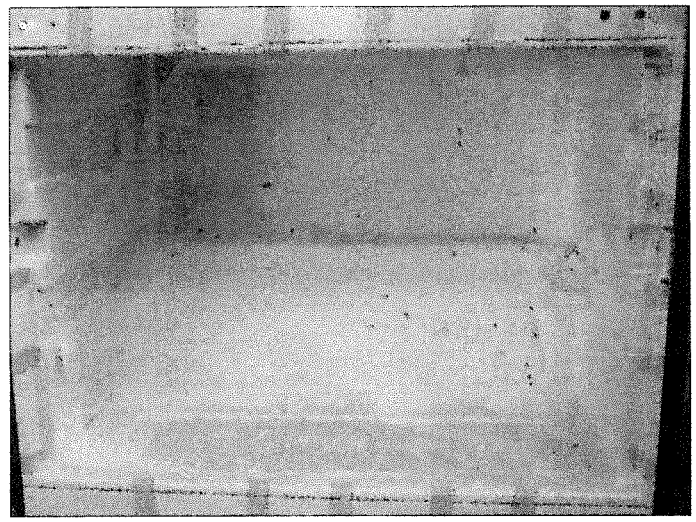
FIG. 4 shows a photograph of a molded polyurethane foam in the freezer department of an appliance cabinet being prepared according the reduced pressure technology of the present invention.
Figure 5:
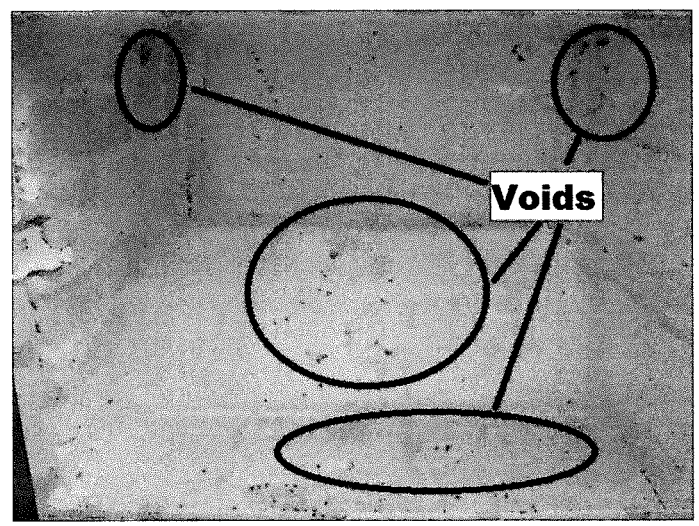
FIG. 5 shows a photograph of a molded polyurethane foam prepared of the identical polyurethane reaction mixture in the freezer department of another appliance cabinet being prepared under standard conditions.

In FIG. 3, an apparatus 1 for the reduced pressure assisted foaming (RAF) is presented. The apparatus 1 comprises two vacuum pumps 2, 3 for reducing the pressure in the system, two vacuum buffer tanks 4, 5 for maintaining the pressure level, which are connected to the vacuum pumps 2, 3, valves 6, pressure gauges 7 for measuring the pressure, an automatic control system 8 for adjusting the pressure, sound silencers 9 for noise reduction and pressure release devices 10 for instant ventilation.

The apparatus 1 further comprises a foaming jig 11 for the fabrication of foamed parts, to which a connect panel 12 can be attached as can be seen in the sectional view at the intersection A-A included in FIG. 3. The foaming jig 11 comprises two cavity areas 11a, 11b, whereas the pressure in each of the cavity areas 11a, 11b can be separately regulated by the automatic control systems 8 which dynamically regulate the pressure between the vacuum buffer tanks 4, 5 and the respective cavity areas 11a, 11b during the foaming cycle. The polyurethane reaction mixture is injected into the cavity 11 by an injection pipe 13.

In the present invention, the reduced pressure foaming jig is connected to at least two separated vacuum systems. However, the inventive method can also be carried out with a single vacuum system. Since no absolute vacuum is necessary to successfully apply this technology minor sealing faults of the jig are acceptable in production which greatly reduces manufacturing costs. The pressure is no longer reduced than the gel time of the polyurethane reaction mixture. The period for the reduced pressure treatment and the level of the pressure reduction are adjusted and optimized individually with respect to the shape and the volume of a cavity and the reaction profile of the polyurethane reaction mixture. Foam leakage can be prevented by immediate venting of the cabinet once it has been fully filled.

The PUR rigid foams can be prepared according to the one-step procedure known in the art where the reaction components are reacted with each other in a continuous or discontinuous fashion and then are applied onto or into suitable forms or substrates. Examples include those published in G. Oertel (editor) "Kunststoff-Handbuch", volume VII, Carl Hanser Verlag, 3$^{rd}$ edition, Munich 1993, pages 267 et seq., and in K. Uhlig (editor) "Polyurethan Taschenbuch", Carl Hanser Verlag, 2$^{nd}$ edition, Vienna 2001, pages 83-102.

In the present case the two-component system with an emulsion (A side) of physical blowing agent in the polyol formulation and an isocyanate (B side) was processed by conventional mixing of these components in a laboratory scale stirring apparatus.

GLOSSARY

Polyol 1: Polyether polyol with a hydroxyl number of 450 mg KOH/g, a theoretical functionality of 4.7 and a viscosity of 15000 mPas at 25° C. (Bayer MaterialScience);

Polyol 2: Polyether polyol with a hydroxyl number of 470 mg KOH/g, a theoretical functionality of 4.0 and a viscosity of 8000 mPas at 25° C. (Bayer MaterialScience);

Polyol 3: aromatic polyetherester polyol with a hydroxyl number of 300 mg KOH/g, a theoretical functionality of 2.0 and a viscosity of 6500 mPas at 25° C., prepared from the reaction of phthalic acid anhydride with diethylene glycol, followed by ethoxylation (Bayer MaterialScience);

Polyol 4: Polyetherpolyol with a hydroxyl number of 380 mg KOH/g, a theoretical functionality of 4.6 and a viscosity of 5350 mPas at 25° C. (Bayer MaterialScience)

Polyol 5: Polyether polyol with a hydroxyl number of 400 mg KOH/g, a theoretical functionality of 4.0 and a viscosity of 26500 mPas at 25° C. (Bayer MaterialScience);

Tegostab® surfactant: Foam stabilizer (Evonik)
amine catalyst tertiary amines which are standard catalysts in rigid foam applications and well known to the skilled person in this art
Isocyanate: Polymeric MDI (Desmodur® 44V20L, Bayer MaterialScience)

Preparation of the Emulsions

A reaction vessel was charged with the polyols according to the recipes as given in table 1. The required amounts of additives such as water, catalysts and stabilizers were metered in individually. Cyclopentane as the physical blowing agent was then added and all components were homogenized for 60 seconds at 4200 rpm. The emulsions thus prepared were stored at 20° C. to assess their stability and visually inspected for phase separations daily.

Determination of Droplet Sizes

The quality of an emulsion was evaluated directly after preparation by measuring the droplet size. To this effect, the emulsion was inspected visually in an optical microscope using bright field transmission microscopy in a layer thickness of the specimen of 20 μm to 40 μm. The microscope used was an Axioplan 2 microscope from Zeiss. Average droplet sizes of a non-aged emulsion thus determined were below 10 μm.

PUR Foam Preparation

In general, only freshly prepared emulsions were used in PUR foam preparation. Between the preparation of an emulsion and its processing into PUR foam a time period of at most one hour had lapsed. Emulsions and the isocyanate were mixed in a laboratory using a stirrer at 4200 rpm, brought to reaction with each other and poured into a mould. The starting materials had a temperature of 20° C. and the mould had a temperature of 40° C. The foams thus prepared were analyzed with respect to their core density, cell size and thermal conductivity.

Reactivity and Free-Rise Density Measurement

To determine the reactivity and the free rise density, a total of 250 g material was mixed and poured into a card box. The cream time, gel time and tack free time were measured during foam rise using a wooden stick. The free rise density was determined 24 hours after foaming using foam pieces out of the foam core and following the principle of Archimedes.

Cell Size Determination

PUR rigid foam samples were cut into slices of 90 μm to 300 μm thickness using a vibrating microtome (Microm HM 650 V, Microm). Bright field transmission microscopy pictures (Axioplan, Zeiss) were taken. For statistical reasons, per analysis for at least 500 cell windows the area of two orthogonal spatial directions was determined. Using the area of each analyzed cell window, a dodecahedron was calculated whose diameter was equated to the diameter of a PUR rigid foam cell. These diameters were averaged and correspond to the cell diameters as stated below.

PUR Foam Preparation Under Reduced Pressure

For comparative reasons machine trials under reduced pressure and under standard conditions were prepared with the identical equipment (HP machine of Hennecke, MT 18 mixing head) in identical cabinet models (BCD-570WFPM). Unless otherwise stated, the raw material temperature was 20° C. (tank), the pressure was 130 bars (mixing head) and the mold temperature was 40° C.

Thermal conductivities were determined according to DIN 12664 and, unless stated otherwise, were measured at 10° C. central temperature.

Core densities given were determined on the samples for thermal conductivity according to DIN 12664 using the corresponding mass.

Table 1 compares the recipe of an emulsion system (2) with a soluble polyol formulation (1) including the properties of the manually prepared PUR rigid foams obtained in the lab.

Table 2 summarizes representative machine data acquired with an emulsion system (2) and a soluble polyol formulation (1).

Table 3 compares representative machine data acquired with the emulsion system (2) under standard conditions and under reduced pressure conditions.

The comparative example 1 involves a modern PUR recipe for current demands on insulation applications for example in appliances. It is already optimized for low thermal conductivities and is a so-called soluble formulation where the physical blowing agent used is completely dissolved in the polyol mixture. Therefore, the nucleating action of droplets can be excluded. It is still appropriate to compare examples 1 and 2 because their reaction profiles are similar. The gel times of 36 seconds for the soluble system (1) and 27 seconds for the emulsion system (2) are similarly short and the free-rise densities of the PUR foams are nearly identical.

In a representative machine trial pieces of PUR rigid foam were prepared with identical dimensions, thereby ensuring that the properties determined therefrom can be compared with each other. It is noted that the minimum fill density in example 1 is significantly lower than in example 2. This is the density that is created when a mould is filled by the PUR rigid foam without overpacking. The higher minimum fill density can be explained by less favorable flowing characteristics of the emulsion system (which can be, of course, addressed by applying a vacuum during processing). Therefore, more reaction mixture must be injected at normal pressure to fill the foam as in the case of the soluble system.

Still the thermal conductivity value is better by 0,5 mW $m^{-1}K^{-1}$ although the PUR rigid foam displayed a higher core density. Without wishing to be bound by theory, it is believed that this difference can be attributed to the nucleation effect of the droplets in the emulsion. This creates more nucleation sites and therefore lowers the average cell size. A reduction by 40% in cell size is observed from comparative example 1 to example 2.

TABLE 1

Lab data

| | | Example | |
|---|---|---|---|
| | | 1 (comparative) | 2 |
| | | Polyol system | |
| | | 1 | 2 |
| Polyol 1 | Weight-parts | 35.0 | 40.0 |
| Polyol 2 | Weight-parts | | 12.0 |
| Polyol 3 | Weight-parts | | 40.0 |
| Polyol 4 | Weight-parts | 40.0 | |
| Polyol 5 | Weight-parts | 25.0 | 8.0 |
| Water | Weight-parts | 2.4 | 1.3 |
| Tegostab ® surfactant | Weight-parts | 2.0 | 2.0 |
| amine catalyst | Weight-parts | 4.18 | 2.22 |
| Cyclopentane[a] | Weight-parts | 16 | 14 |
| Isocyanate[a] | Weight-parts | 151 | 120 |
| Index | NCO/OH | 118 | 110 |
| Appearance | qualitative | clear | cloudy |
| Droplet size[b] | μm | — | 8 |

TABLE 1-continued

Lab data

| | | Example | |
|---|---|---|---|
| | | 1 (comparative) | 2 |
| | | Polyol system | |
| | | 1 | 2 |
| Emulsion storage stability | d | — | >4 |
| Cream time | s | 8 | 6 |
| Gel time | s | 36 | 27 |
| Tack-free time | s | 70 | 42 |
| Free-rise density | kg/m$^3$ | 23.7 | 25.1 |

[a] for 100 weight-parts of polyol formulation;
[b] determined on a non-aged emulsion.

TABLE 2

Representative machine data

| | | Example | |
|---|---|---|---|
| | | 1 (comparative) | 2 |
| | | Polyol system | |
| | | 1 | 2 |
| Cream time | s | 2 | 2 |
| Gel time | s | 23 | 17 |
| Free-rise density | kg/m$^3$ | 23.7 | 24.0 |
| Minimum fill density | kg/m$^3$ | 30.7 | 34.7 |
| Core density | kg/m$^3$ | 30 | 33 |
| Thermal conductivity | mW m$^{-1}$K$^{-1}$ | 18.9 | 18.4 |
| Cell size[a] | µm | 150 | 90 |

[a] according to an in-house procedure described previously.

TABLE 3

Cabinet filling trial results with emulsion system (2) under standard conditions and reduced pressure conditions.

| | | Example | |
|---|---|---|---|
| | | 3 (comparative) | 4 |
| | | Polyol system | |
| | | 2 | 2 |
| Foam filling weight | kg | 11.35 | 11.35 |
| Δ Foam jig pressure | mbar | 0 | −200 |
| Reduced pressure time | s | 0 | 15 |
| Cream time | s | 4 | 4 |
| Gel time | s | 21 | 21 |
| Free-rise density | kg/m$^3$ | 23.3 | 23.3 |
| Demold time | Minutes | 10 | 10 |
| Foam core density[a] | kg/m$^3$ | 34.5 | 36.0 |
| Thermal conductivity[a] (10° C.) | mW m$^{-1}$K$^{-1}$ | 18.3 | 18.4 |
| Average compression strength[a] | kPa | 233 | 243 |
| Cell size[b] | µm | 90-100 | 90-100 |
| Void formation | | serious | no |

[a] foam samples taken from the divider part of the cabinet,
[b] according to an in-house procedure described previously.

As shown in Table 3, the reduced pressure foaming technology does not interfere with the properties of so obtained polyurethane foams. The thermal conductivity values and cell sizes of foams obtained under standard conditions (3) are very well comparable to those obtained under reduced pressure conditions (4). Furthermore, the core density is even higher in case of example (4) although identical filling weights had been used in case of both examples. Finally cabinets having been filled with polyurethane foam under reduced pressure as in case of example (4) do not show any voids on the foam surface which directly illustrates a very even distribution of the polyurethane foam within the cabinet. This even foam distribution is known to induce a significant reduction of the overall energy consumption of appliances which therefore exceeds the performance of foams having been molded under standard conditions.

The invention claimed is:

1. A method for the production of a polyurethane foam, comprising the steps of:
providing an isocyanate-reactive component A comprising a polyol component A1 which further comprises a physical blowing agent T, wherein the physical blowing agent T is present in the isocyanate-reactive component A in the form of an emulsion with the polyol component A1 constituting the continuous phase and droplets of the physical blowing agent T the dispersed phase of the emulsion, wherein the average size of the droplets of the physical blowing agent T is ≥0.1 µm to ≤20 µm, the droplet size being determined by using an optical microscope operating in bright field transmission mode, wherein the polyol component A1 comprises:
A1a: a polyether polyol with a hydroxyl number of ≥15 mg KOH/g to ≤550 mg KOH/g and a functionality of ≥1.5 to ≤6.0 obtained by the addition of an epoxide to one or more starter compounds selected from the group of carbohydrates and/or at least difunctional alcohols; and
A1b: a polyether polyol with a hydroxyl number of ≥100 mg KOH/g to ≤550 mg KOH/g and a functionality of ≥1.5 to ≤5.0 obtained by the addition of an epoxide to an aromatic amine; and
A1c: a polyester polyether polyol with a hydroxyl number of ≥100 mg KOH/g to ≤450 mg KOH/g and a functionality of ≥0.1 to ≤3.5 obtained by the addition of an epoxide to the esterification product of an aromatic dicarboxylic acid derivative and an at least difunctional alcohol;
combining at least the isocyanate-reactive component A and an isocyanate component B, thereby obtaining a polyurethane reaction mixture;
providing the polyurethane reaction mixture in a cavity; and
reducing the pressure within the cavity to a pressure lower than ambient pressure, wherein the pressure is reduced by ≥1 mbar up to ≤900 mbar;
wherein the cavity is ventilated to ambient pressure before the gel time of the polyurethane reaction mixture is reached.

2. The method according to claim 1, wherein the pressure within the cavity is reduced before the polyurethane reaction mixture is provided in the cavity.

3. The method according to claim 1, wherein the pressure within the cavity is reduced after the polyurethane reaction mixture is provided in the cavity.

4. The method according to claim 1, wherein the pressure is reduced by ≥50 mbar to ≤300 mbar.

5. The method according to claim 1, wherein the cavity is ventilated to ambient pressure when 60 to 99% of the gel time of the polyurethane reaction mixture is reached.

6. The method according to claim 1, wherein the polyurethane reaction mixture has a gel time of ≤50 seconds.

7. The method according to claim 1, wherein before ventilating to ambient pressure, the step of reducing the pressure within the cavity to a pressure lower than ambient pressure is conducted in such a way that after an initial reduction of the pressure, the pressure is allowed to rise as a consequence of an expansion of the polyurethane reaction mixture.

8. The method according to claim 1, wherein before ventilating to ambient pressure, the reduced pressure is kept constant.

9. The method according to claim 1, wherein the pressure within the cavity is adjusted to different levels at different cavity areas by using two individually operatable vacuum systems.

10. The method according to claim 7, wherein the pressure level within different cavity areas is adjusted, wherein the pressure level within a cavity area having a first shape is adjusted to a first pressure level, wherein the pressure level within a cavity area having a second shape is adjusted to a second pressure level, wherein the first shape is different than the second shape, and wherein the first pressure level is different than the second pressure level.

11. The method according to claim 9, wherein the physical blowing agent T is present in the isocyanate-reactive component A in the form of an emulsion with the polyol component A1 constituting the continuous phase and droplets of the physical blowing agent T the dispersed phase of the emulsion, wherein the average size of the droplets of the physical blowing agent T is ≥0.1 µm to ≤15 µm, the droplet size being determined by using an optical microscope operating in bright field transmission mode.

12. The method according to claim 9, wherein the polyol component A1 further comprises:
A1c': a polyester polyol with a hydroxyl number of ≥100 mg KOH/g to ≤450 mg KOH/g and a functionality of ≥1.5 to ≤3.5 obtained by the esterification of a polycarboxylic acid component and a polyalcohol component, wherein the total content of aromatic dicarboxylic acid derivatives employed in the esterification, based on free aromatic dicarboxylic acids, is ≤48.5 mass-%, based on the total mass of polyalcohol component and polycarboxylic acid component,
and/or
A1d: a polyether polyol with a hydroxyl number of ≥500 mg KOH/g to ≤1000 mg KOH/g and a functionality of ≥1.5 to ≤5.0 obtained by the addition of an epoxide to an aliphatic amine and/or a polyfunctional alcohol,
and/or
A1e: a di-, tri- or tetrafunctional aminic or alcoholic chain extender or cross-linker.

13. The method according to claim 1, wherein the physical blowing agent T is selected from the group consisting of hydrocarbons, halogenated ethers, perfluorinated hydrocarbons with 1 to 6 carbon atoms and mixtures thereof.

14. The method according to claim 9, wherein the mass ratio of A1:T is ≥5:1 to ≤12:1.

15. The method according to claim 9, wherein the polyol component Al has a viscosity according to EN ISO 3219 at 20° C. of ≥1000 mPas to ≤18000 mPas.

16. The method according to claim 1, wherein the isocyanate-reactive component A further comprises:
A2: water;
A3: at least one stabilizer selected from the group of polyether polydimethylsiloxane copolymers; and
A4: at least one catalyst selected from the group consisting of triethylenediamine, N,N-dimethylcyclohexylamine, tetramethylenediamine, 1-methyl-4-dimethylaminoethylpiperazine, triethylamine, tributylamine, dimethylbenzylamine, N,N'N"-tris-(dimethylaminopropyl)hexahydrotriazine, dimethylaminopropylformamide, N,N,N',N'-tetramethylethylenediamine, N,N,N', N'-tetramethylbutanediamine, tetramethylhexanediamine, pentamethyldiethylenetriamine, tetramethyldiaminoethyl ether, dimethylpiperazine, 1,2-dimethylimidazole, 1-azabicyclo[3.3.0]octane, bis(dimethylaminopropyl) urea, N-methylmorpholine, N-ethylmorpholine, N-cyclohexylmorpholine, 2,3-dimethyl-3,4,5,6-tetrahydropyrimidine, triethanolamine, diethanolamine, triisopropanolamine, N-methyldiethanolamine, N-ethyldiethanolamine, and dimethylethanolamine.

17. The method according to claim 1, wherein the isocyanate component B comprises:
B1: at least one isocyanate selected from the group consisting of toluylene diisocyanate, diphenylmethane diisocyanate, polyphenylpolymethylene polyisocyanate, xylylene diisocyanate, naphthylene diisocyanate, hexamethylene diisocyanate, diisocyanatodicylclohexylmethane, and isophorone diisocyanate; and/or
B2: an isocyanate-terminated prepolymer obtained from at least one polyisocyanate B1 and at least one isocyanate reactive compound selected from the group consisting of:
A1c': a polyester polyol with a hydroxyl number of ≥100 mg KOH/g to ≤450 mg KOH/g and a functionality of ≥1.5 to ≤3.5 obtained by the esterification of a polycarboxylic acid component and a polyalcohol component, wherein the total content of aromatic dicarboxylic acid derivatives employed in the esterification, based on free aromatic dicarboxylic acids, is ≥48.5 mass-%, based on the total mass of polyalcohol component and polycarboxylic acid component;
A1d: a polyether polyol with a hydroxyl number of ≥500 mg KOH/g to ≤1000 mg KOH/g and a functionality of ≥1.5 to ≤5.0 obtained by the addition of an epoxide to an aliphatic amine and/or a polyfunctional alcohol; and
A1f: a polyether carbonate polyol with a functionality of ≥1.5 to ≤8.0 and a number average molecular weight of ≥500 g/mol to ≤10000 g/mol.

18. The method according to claim 1, wherein the cavity into which the polyurethane reaction mixture is provided is a refrigerator insulation frame.

* * * * *